Feb. 22, 1949.  C. H. WELCH  2,462,584
NONSKID DEVICE FOR AUTOMOBILES
Filed June 8, 1948  2 Sheets-Sheet 1
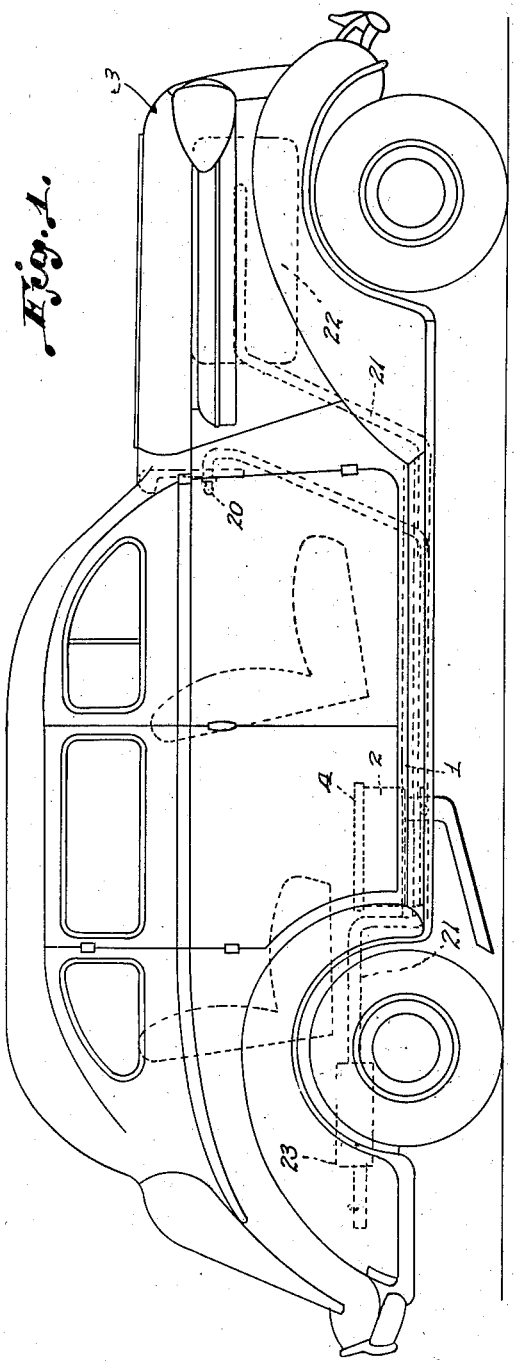
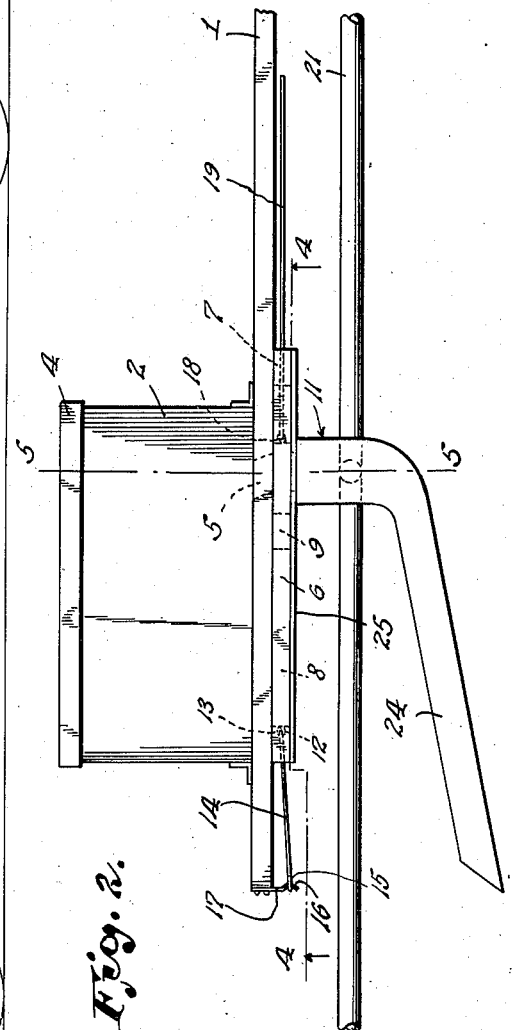
INVENTOR,
Charles H. Welch.
BY
ATTORNEYS.

Feb. 22, 1949.　　　　C. H. WELCH　　　　2,462,584
NONSKID DEVICE FOR AUTOMOBILES
Filed June 8, 1948　　　　　　　　　　　　2 Sheets-Sheet 2
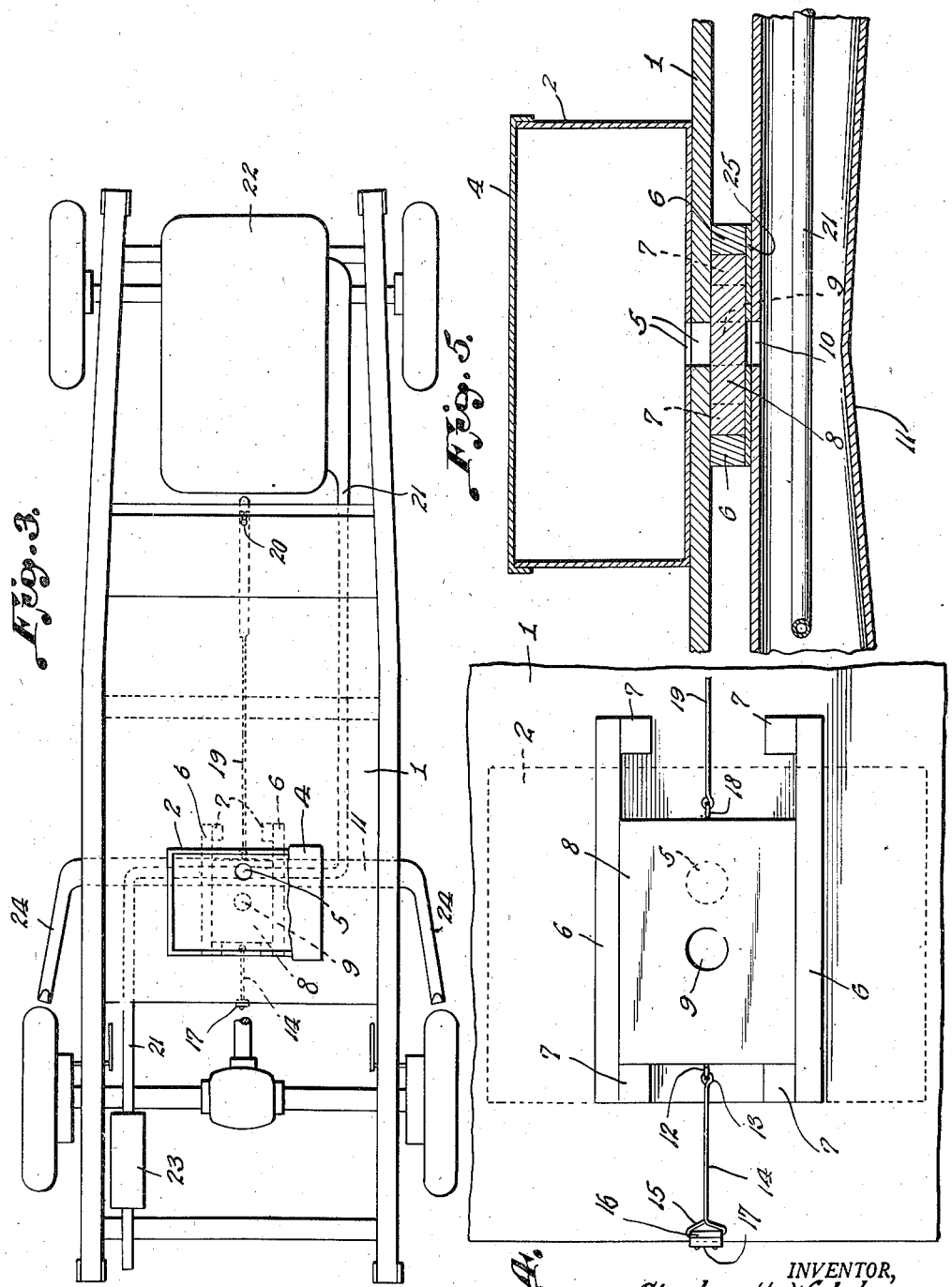

Patented Feb. 22, 1949

2,462,584

UNITED STATES PATENT OFFICE 2,462,584

NONSKID DEVICE FOR AUTOMOBILES

Charles H. Welch, Flint, Mich., assignor of twenty-five per cent to Wrex A. Weaver, Flint, Mich.

Application June 8, 1948, Serial No. 31,640

1 Claim. (Cl. 291—34)

This invention relates to a non-skid device for automobiles.

An object of the invention is the provision of an efficient manually operated device on a motor vehicle for placing dry or heated sand on the surface, over which the motor vehicle is passing, preferably in front of the rear wheels of said motor vehicle.

Another object of the invention is the production of a sanding mechanism in which a peculiar valve device is employed, and which valve device is capable of being easily operated by the driver of the motor vehicle.

A still further object of the invention is the construction of an efficient sanding mechanism in which a sliding valve device is employed, which valve device can be moved to an open position, for permitting sand to drop on the ground, by the operator simply pulling on a grip or throttle, preferably placed on the instrument board of the motor vehicle.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a motor vehicle, partly showing in full lines and partly in dotted lines the mechanism constructed in accordance with this invention.

Figure 2 is an enlarged, fragmentary view in elevation of the mechanism.

Figure 3 is a top plan view of a portion of a motor vehicle, showing my improved mechanism assembled therewith.

Figure 4 is a horizontal, sectional view taken on line 4—4, Fig. 2, and looking in the direction of the arrows.

Figure 5 is a vertical, sectional view taken on line 5—5, Fig. 2.

Referring to the drawings, in which the preferred embodiment of this invention is illustrated, 1 designates the floor of the motor vehicle, which constitutes the support for the sanding mechanism. A sand container 2 is secured upon the floor 1, preferably in the rear portion of the motor vehicle 3; this container 2 is provided with a suitable cover 4. The floor 1 and the bottom of the sand container 2 are provided with registering discharge openings 5, Fig. 5. Secured to the floor 1, under the sand container 2, are two valve guides 6, Fig. 4, each having an inwardly extending stop 7 at each end. A sliding valve 8 is positioned between the guides 6. Valve 8 is provided with a valve opening 9, which is adapted to register with the discharge opening 5, when sand is to be discharged through opening 10 into the transverse casing 11 (Fig. 5).

The sliding valve 8 is provided on its rear with an eye 12, into which extends eye 13 of rod 14 (Fig. 4); this rod 14 is provided at its outer end with a loop 15. Loop 15 is positioned in the hook 16, formed on the lower end of the flat, vertically extending spring 17. Spring 17 is securely fastened at its upper end to the floor 1. On the front end of the sliding valve 8 is an eye 18. A flexible wire 19 is fastened at its inner end to eye 18, the outer end of said wire 19 being connected in any suitable manner to the knob or throttle 20, Fig. 1.

An exhaust pipe 21 extends from the motor 22 to the transverse casing 11, and through said casing (Fig. 5) and thence to the muffler 23, shown in dotted lines, Fig. 1. By this single exhaust pipe extending through the transverse casing 11, the sand is sufficiently heated in the sand container 2 to make the sand free flowing.

The transverse casing 11 is provided with two downwardly extending chutes 24, which preferably are capable of discharging dry sand directly in front of the rear wheels of the motor vehicle, Fig. 1.

A bearing plate 25 is placed underneath the guides 6 and valve 8 and is located on top of the transverse casing 11, Fig. 5. This plate 25 provides an efficient surface upon which valve 8 slides.

The valve 8 is normally held by flat spring 17 in a closed position, Fig. 4. When the operator pulls on knob 20, the valve 8 is pulled forward, against the action of spring 17, until opening 9 registers with the openings 5, whereupon sand is allowed to discharge into the transverse casing 11 and thence into chutes 24.

The stops 7 prevent the sliding valve from having too much movement in either direction.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

The combination with an automobile having rear wheels, a floor and an exhaust pipe extending beneath said floor, of a sand box resting on said floor and having a sand delivery opening in its bottom, said floor having an opening registering with the first opening, a pair of spaced L-shaped guides extending longitudinally of and beneath the floor, a sliding valve mounted in said guides and having a sand delivery opening therein, a spring connecting the automobile frame and the valve, the spring normally holding the last opening out of registry with the floor opening, manually controlled means to move the valve against the action of the spring and bring the valve and floor openings into registry, a bearing plate held to the lower side of said guides, a main sand duct extending transversely of the automobile and held against said plate, said bearing plate and sand duct having registering openings aligned with the floor opening, said exhaust pipe extending along the longitudinal axis of and within the major part of said duct and close below said valve, and delivery nozzles extending downwardly from the ends of said duct to terminate in front of said rear wheels.

CHARLES H. WELCH.

REFERENCES CITED

The following references are of record in the file of this patent:

UNITED STATES PATENTS

| Number | Name | Date |
| --- | --- | --- |
| 1,342,316 | Weise | June 1, 1920 |
| 1,524,789 | Johnson | Feb. 3, 1925 |
| 2,371,274 | Weigold | Mar. 13, 1945 |